(12) United States Patent
Wang (10) Patent No.: US 10,598,979 B2
(45) Date of Patent: Mar. 24, 2020

(54) COLOR FILTER SUBSTRATE AND MANUFACTURING METHOD THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventor: Jianjun Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/534,142

(22) PCT Filed: Nov. 30, 2016

(86) PCT No.: PCT/CN2016/107837
§ 371 (c)(1),
(2) Date: Jun. 8, 2017

(87) PCT Pub. No.: WO2017/124839
PCT Pub. Date: Jul. 27, 2017

(65) Prior Publication Data
US 2018/0052358 A1    Feb. 22, 2018

(30) Foreign Application Priority Data

Jan. 20, 2016 (CN) .......................... 2016 1 0038937

(51) Int. Cl.
*G02F 1/1335* (2006.01)
*G09G 3/34* (2006.01)
*G09G 3/36* (2006.01)

(52) U.S. Cl.
CPC .. *G02F 1/133514* (2013.01); *G02F 1/133502* (2013.01); *G02F 1/133526* (2013.01);
(Continued)

(58) Field of Classification Search
CPC ......... G02F 1/133514; G02F 1/133502; G02F 1/133617; G02F 1/133526; G09G 3/3611; G09G 3/3426
See application file for complete search history.

(56) References Cited

U.S. PATENT DOCUMENTS 7,136,121 B2 * 11/2006 Yeh .................... G02F 1/133516
349/106
9,612,476 B2 * 4/2017 Qiu ........................ G02B 6/005
(Continued)

FOREIGN PATENT DOCUMENTS

CN   101299106 A   11/2008
CN   101315483 A   12/2008
(Continued)

OTHER PUBLICATIONS

International Search Report and Written Opinion dated Mar. 6, 2017; PCT/CN2016/107837.
(Continued)

*Primary Examiner* — Ariel A Balaoing
(74) *Attorney, Agent, or Firm* — Ladas & Parry, LLP; Frank Gao (57) ABSTRACT

A color filter substrate includes a base substrate and a color filter formed on the base substrate, wherein the color filter includes at least one color area; the color filter substrate further includes at least one of at least one kind of fluorescent powder or at least one antireflective film, wherein each kind of fluorescent powder in the at least one kind of fluorescent powder corresponds to one color area in the color filter; each antireflective film in the at least one antireflective film corresponds to one color area in the color filter, the fluorescent powder is configured to convert light, of which a color is different from a color of a corresponding
(Continued)

color area, in incident light into light of which a color is the same with the color of the corresponding color area.

17 Claims, 4 Drawing Sheets

(52) U.S. Cl.
CPC ..... *G02F 1/133617* (2013.01); *G09G 3/3426* (2013.01); *G09G 3/3611* (2013.01); *G02F 2202/046* (2013.01)

(56) References Cited

U.S. PATENT DOCUMENTS

| | | | | |
|---|---|---|---|---|
| 2003/0222576 | A1* | 12/2003 | Lu | H01L 27/322 313/504 |
| 2005/0083457 | A1* | 4/2005 | Fujimori | G02F 1/133553 349/113 |
| 2005/0275343 | A1* | 12/2005 | Tanaka | H01L 27/322 313/504 |
| 2008/0151152 | A1* | 6/2008 | Yang | G02F 1/133502 349/106 |
| 2009/0115713 | A1 | 5/2009 | Kakinuma et al. | |
| 2009/0161035 | A1* | 6/2009 | Shao | G02F 1/133512 349/61 |
| 2011/0135958 | A1* | 6/2011 | Okada | C07F 5/022 428/704 |
| 2012/0033164 | A1* | 2/2012 | Chen | G02B 5/201 349/108 |
| 2012/0127561 | A1* | 5/2012 | Nishida | G02F 1/167 359/296 |
| 2014/0002770 | A1* | 1/2014 | Wang | G02F 1/1336 349/61 |
| 2014/0063413 | A1* | 3/2014 | Kim | G02F 1/133504 349/65 |
| 2015/0277188 | A1* | 10/2015 | He | G02F 1/133617 349/69 |
| 2015/0301408 | A1 | 10/2015 | Li | |
| 2017/0003423 | A1 | 1/2017 | Jiang et al. | |

FOREIGN PATENT DOCUMENTS

| | | |
|---|---|---|
| CN | 101424819 A | 5/2009 |
| CN | 102879948 A | 1/2013 |
| CN | 103278876 A | 9/2013 |
| CN | 104932136 A | 9/2015 |
| CN | 105487280 A | 4/2016 |

OTHER PUBLICATIONS

The Second Chinese Office Action dated Aug. 9, 2018; Appln. No. 201610038937.7.

* cited by examiner

```
┌─────────────────────────────────────────────────────────────────┐
│  Adding fluorescent powder corresponding to a color area on an  │
│  incident side of the corresponding color area, and forming a   │
│  fluorescent powder film                                        │
└─────────────────────────────────────────────────────────────────┘
                                │
                                ▼
┌─────────────────────────────────────────────────────────────────┐
│  Performing photolithography on the fluorescent powder film    │
│  according to the shape of the color area                       │
└─────────────────────────────────────────────────────────────────┘
```

FIG. 7

```
┌─────────────────────────────────────────────────────────────────┐
│   Preparing fluorescent powder particles coated with organic    │
│                         substances                              │
└─────────────────────────────────────────────────────────────────┘
                                │
                                ▼
┌─────────────────────────────────────────────────────────────────┐
│  Obtaining mixed materials by mixing the fluorescent powder     │
│  particles coated with the organic substances and materials     │
│  for forming color filter with corresponding color areas        │
└─────────────────────────────────────────────────────────────────┘
                                │
                                ▼
┌─────────────────────────────────────────────────────────────────┐
│     Forming the color filter by adoption of the mixed materials │
└─────────────────────────────────────────────────────────────────┘
```

COLOR FILTER SUBSTRATE AND MANUFACTURING METHOD THEREOF

TECHNICAL FIELD

Embodiments of the present disclosure relate to a color filter substrate and a manufacturing method thereof.

BACKGROUND

Compared with the conventional cathode ray tube display, liquid crystal displays (LCDs) have the advantages of high display quality, non electromagnetic radiation, small volume, low power consumption, etc. With the development of technology and the reduction of cost, LCDs have gradually become the mainstream display devices. Currently, the LCDs are widely applied in fixed or portable display devices. In recent years, portable display devices (e.g., mobile phones and tablet PCs) become the mainstream of consumption.

The principle of the LCDs in generating color patterns is that light is incident into a color filter substrate, and color filter in the color filter substrate allows light with required color to run through and filters out light with other colors. The color filter substrate in the prior art has low light transmittance and hence affects the display effect.

SUMMARY

At least one embodiment of the disclosure provides a color filter substrate, comprising a base substrate and a color filter formed on the base substrate, wherein the color filter includes at least one color area; the color filter substrate further comprises at least one of at least one kind of fluorescent powder or at least one antireflective film, wherein each kind of fluorescent powder in the at least one kind of fluorescent powder corresponds to one color area in the color filter, each antireflective film in the at least one antireflective film corresponds to one color area in the color filter, the fluorescent powder is located at an incident side of a corresponding color area or distributed in the corresponding color area, the fluorescent powder is configured to convert light, of which a color is different from a color of a corresponding color area, in incident light into light of which a color is the same with the color of the corresponding color area, and the antireflective film is located on the incident of the corresponding color area and/or on the light-emitting side of the corresponding color area, the antireflective film is configured to reduce a reflectivity of the light of which the color is the same with the color of the corresponding color area.

In the color filter substrate provided by the embodiment of the disclosure, the fluorescent powder converts the light, of which the color is different from the color of the color filter, in the incident light into the light of which the color is the same with the color of the color filter, so as to allow the light pass through the color filter. And/or, the antireflective film is added, the reflectivity on the two interfaces of the color filter substrate is reduced, so the transmittance of the light running through the color filter substrate can also be improved.

In an embodiment of the disclosure, the fluorescent powder is disposed on an incident side of the corresponding color area, wherein, a film made from the fluorescent powder is disposed on the incident side of the corresponding color area.

In an embodiment of the disclosure, the fluorescent powder is distributed in the corresponding color area comprising: particles containing the fluorescent powder are distributed in the corresponding color area.

In an embodiment of the disclosure, the at least one kind of fluorescent powder includes fluorescent powder for converting blue (B) light into red (R) light and fluorescent powder for converting B light into green (G) light.

In an embodiment of the disclosure, the antireflective film is disposed on an incident side of the corresponding color area and contacts with the corresponding color area.

In an embodiment of the disclosure, the antireflective film is disposed on a light-emitting side of the corresponding color area and makes contact with the corresponding color area.

In an embodiment of the disclosure, the color filter substrate further comprises a protective layer; the protective layer is disposed on an incident side of the color filter substrate; the antireflective film is disposed between the protective layer and the color area; and a refractive index of the antireflective film is between a refractive index of the color area and a refractive index of the protective layer.

In an embodiment of the disclosure, the base substrate is disposed a light-emitting side of the color filter substrate, the antireflective film is disposed on a light-emitting side of the corresponding color area; and a refractive index of the antireflective film is between a refractive index of the color area and a refractive index of the base substrate.

At least one embodiment of the disclosure provides a method for manufacturing a color filter substrate, comprising: mixing fluorescent powder corresponding to at least one color area into the at least one color area of a color filter or arranging fluorescent powder corresponding to the at least one color area on an incident side of the at least one color area of the color filter, and forming a protective layer on the color filter provided with the fluorescent powder, in which each kind of fluorescent powder corresponds to one color area in the color filter, and the fluorescent powder is configured to convert light of at least one color, different from a color of a corresponding color area, in light of backlight into light of which a color is the same with the color of the corresponding color area; and/or arranging an antireflective film corresponding to at least one color area on an incident side and/or a light-emitting side of the at least one color area of the color filter, in which the antireflective film covers the color area corresponding to the antireflective film and is configured to reduce a reflectivity of light, of which the color is the same with the color of the corresponding color area, in light of the backlight.

In an embodiment of the disclosure, arranging the fluorescent powder corresponding to the color area on the incident side of the color area in at least one color area of the color filter comprises: arranging a film made from the fluorescent powder, of which a type corresponds to the color area, on the incident side of the corresponding color area; and performing photolithography on the film made from the fluorescent powder according to a shape of the color area.

In an embodiment of the disclosure, arranging the fluorescent powder corresponding to the color area in the at least one color area of the color filter comprises: obtaining fluorescent powder particles coated with organic substances by coating particles of the fluorescent powder using organic substances of which a polarity is similar to that of the fluorescent powder corresponding to the color area; obtaining mixed materials by mixing the fluorescent powder particles coated with the organic substances and materials for forming the color filter for the corresponding color area; and forming the color filter by adoption of the mixed materials.

In an embodiment of the disclosure, the fluorescent powder includes fluorescent powder for converting B light into R light and fluorescent powder for converting B light into G light.

In an embodiment of the disclosure, arranging the antireflective film corresponding to the color area on the incident side of the at least one color area of the color filter, comprises: arranging the antireflective film corresponding to the color area on the incident side of the color area, and performing photolithography on the antireflective film according to a shape of the color area; and arranging the antireflective film corresponding to the color area on the light-emitting side of the at least one color area of the color filter, comprises: arranging the antireflective film corresponding to the color area on the incident side of the base substrate; performing photolithography on the antireflective film according to the shape and the position of the color area; and forming the color filter on the antireflective film.

In an embodiment of the disclosure, the color filter is disposed between the base substrate and the protective layer, wherein, the protective layer is disposed on the incident side of the color filter substrate, and a refractive index of the antireflective film is between a refractive index of the protective layer and a refractive index of the color filter.

In an embodiment of the disclosure, the color filter is disposed between the base substrate and the protective layer, wherein, the base substrate is disposed on the light-emitting side of the color filter substrate, a refractive index of the antireflective film is between a refractive index of the color filter and a refractive index of the base substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

At least one embodiment of the present disclosure provides a color filter substrate, which comprises a base substrate and color filter formed on the base substrate. The color filter includes at least one color area. The color filter substrate further comprises at least one kind of fluorescent powder and/or at least one antireflective film, wherein each kind of fluorescent powder in the at least one kind of fluorescent powder corresponds to one color area in the color filter, each antireflective film in the at least one antireflective film corresponds to one color area in the color filter; the fluorescent powder is disposed on an incident side of corresponding color area and/or disposed in the corresponding color area and configured to convert light of at least one color, different from the color of the corresponding color area, in incident light into light of which the color is the same with the color of the color area; and the antireflective film is disposed on the incident side of the corresponding color area and/or a light-emitting side of the corresponding color area and configured to reduce the reflectivity of the light, of which the color is the same with the color of the corresponding color area, in the incident light.

When the color filter substrate operates, light is incident from a protective layer and emitted from the color filter and the base substrate. Therefore, one side of the color filter facing the protective layer is an incident side of the color filter, and one side of the color filter facing the base substrate is a light-emitting side of the color filter.

In the color filter substrate provided by the embodiment of the present disclosure, the fluorescent powder is disposed on the incident side of the color filter and/or disposed in the color filter and converts the light, of which the color is different from the color of the color filter, in the incident light into the light of which the color is the same with the color of the color filter, before the filtering of the color filter. Thus, the light of which the color is different from the color of the color filter is converted into the light of which the color is the same with the color of the color filter and can runs through the color filter. As the fluorescent powder is disposed on the incident side of the color filter or in the color filter, the transmittance of the light running through the color filter can be improved. Apart from the means of the fluorescent powder, when the antireflective film is disposed on the incident side and/or the light-emitting side of the color filter, the reflectivity of the light running through the color filter substrate can be reduced, so the transmittance of the light running through the color filter substrate can also be improved.

Figure 1:
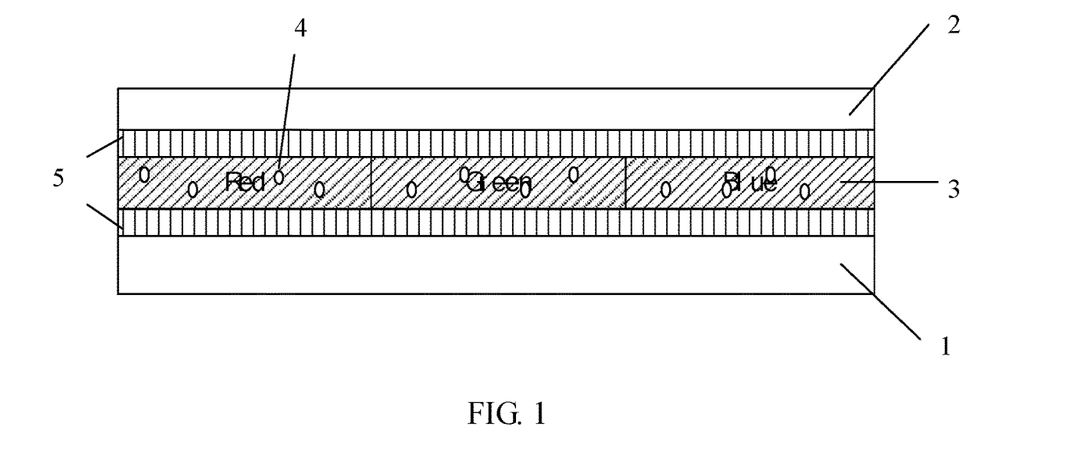
FIG. 1 is a schematic structural view of a color filter substrate provided by one embodiment of the present disclosure.

As illustrated in FIG. 1, one embodiment of the present disclosure provides a color filter substrate 100, which comprises a base substrate 1, a protective layer 2 and a color filter 3 disposed between the base substrate 1 and the protective layer 2. The color filter 3 includes a plurality of color areas. The color filter substrate 100 further comprises at least one of at least one kind of fluorescent powder 4 or at least one antireflective film 5.

Each kind of fluorescent powder in the at least one kind of fluorescent powder 4 corresponds to one color area in the plurality of color areas; and each antireflective film 5 in the at least one antireflective film 5 corresponds to one color area in the plurality of color areas.

Each kind of fluorescent powder in the at least one kind of fluorescent powder 4 is disposed on an incident side of corresponding color area and/or disposed in the corresponding color area and configured to convert light of at least one color, different from the color of the corresponding color area, in incident light into light of which the color is the same with the color of the color area; and the antireflective film 5 is disposed on at least one side of the incident side of the corresponding color area or a light-emitting side of the corresponding color area and configured to reduce the reflectivity of the light of which the color is the same with the color of the corresponding color area.

In the embodiment of the present disclosure, the color area may also be referred to as wavelength area and may be configured to filter out light with wavelength except a specific wavelength. In the embodiment of the present disclosure, the color areas can be divided into three types: red (R) areas, green (G) areas and blue (B) areas, in which the R area is configured to allow R light to run through and filter out light with the wavelength except the wavelength of the R light; the G area is configured to allow G light to run through and filter out light with the wavelength except the wavelength of the G light; and the B area is configured to allow B light to run through and filter out light with the wavelength except the wavelength of the B light.

The transmittance of the light running through the color filter substrate 100 may be improved by adding the fluorescent powder 4; the transmittance of the light running through the color filter substrate 100 may also be improved by arranging the antireflective films 5; and the transmittance of the light running through the color filter substrate 100 may also be improved by simultaneously arranging the fluorescent powder 4 and the antireflective films 5. Description will be given below to the embodiments of improving the transmittance of the light running through the color filter substrate 100 by the above means.

First Embodiment: Improving the Transmittance of the Light Running Through the Color Filter Substrate 100 by Adding the Fluorescent Powder 4

When the fluorescent powder 4 is not added, only light, of which the color is the same with the color of the color filter 3, in the incident light can run through the color filter 3. The fluorescent powder 4 may convert the wavelength of light, of which the color is different from the color of the color filter 3, into wavelength corresponding to the color of the color filter 3, so as to convert the light of which the color is different from the color of the color filter 3 into light of which the color is the same with the color of the color filter 3. Thus, the light can run through the color filter 3, so that the transmittance of the light can be improved.

Figure 2:
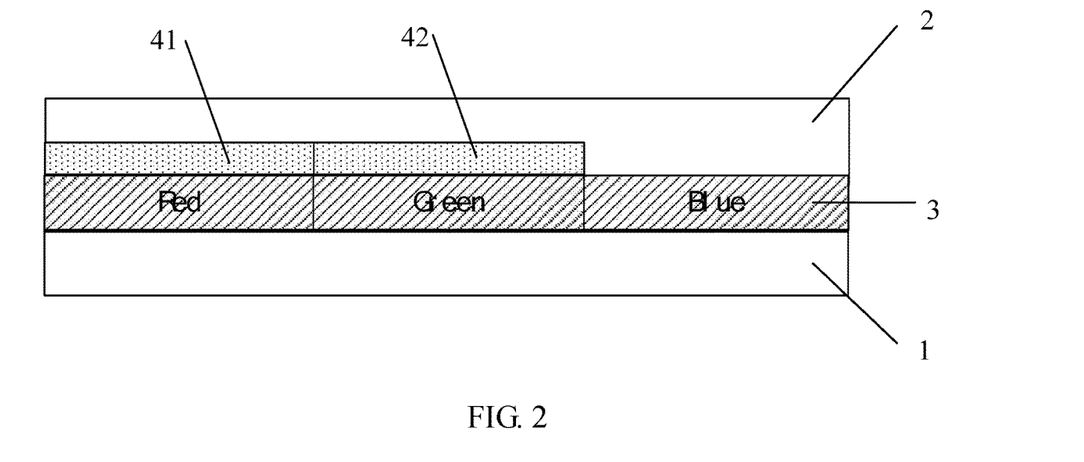
FIG. 2 is a schematic structural view of a color filter substrate provided by another embodiment of the present disclosure.

In the embodiment of the present disclosure, the color filter 3 may include a plurality of color areas, for instance, R areas, G areas and B areas. The plurality of color areas are arranged in a flexible manner. FIG. 2 illustrates one arrangement mode of the plurality of color areas: the R area is on the left; the G area is in the middle; and the B area is on the right. FIG. 2 only schematically shows one arrangement mode. The actual arrangement modes of the color areas are not limited to FIG. 2 and may be randomly collocated. For instance, the R area is in the middle; the G area is on the left; and the B area is on the right. The color area of the color filter 3 is configured to filter out light with color except the color of the color area. For instance, an R color area only allows R light to run through. The same layer of color filter 3 may include one or more colors, and each color corresponds to certain area (namely the color area). The type of the fluorescent powder 4 in the embodiment of the present disclosure corresponds to the color of the color area, and the fluorescent powder is configured to convert light, of which the color is different from the color of the color area, in the incident light into light of which the color is the same with the color of the color area.

In one embodiment of the present disclosure, the at least one kind of fluorescent powder 4 includes fluorescent powder 41 for converting B light into R light and fluorescent powder 42 for converting B light into G light. The fluorescent powder is generally oxide or fluoride crystal, glass or the like doped with rare earth ions. For the convenience of description, the fluorescent powder 41 capable of converting the B light into the R light is hereinafter referred to as R powder, and the fluorescent powder 42 capable of converting the B light into the G light is hereinafter referred to as G powder.

The color filter substrate comprising the fluorescent powder 4 may be divided into two types according to the setting position of the fluorescent powder 4:

1. The fluorescent powder 4 is disposed on the incident side of the color filter 3.

The color filter substrate 100 comprises a base substrate 1, a color filter 3 and a protective layer 2. When the color filter substrate 100 operates, light is incident into the protective layer 2 and emitted from the color filter 3 and the base substrate 1. Therefore, one side of the color filter 3 facing the protective layer 2 is an incident side of the color filter 3, and one side of the color filter 3 facing the base substrate 1 is a light-emitting side of the color filter 3. In FIG. 1, the color filter substrate 100 is placed by arranging the protective layer 2 in the upper direction, namely the protective layer 2 of the color filter substrate is disposed on the upper part.

Films made from the fluorescent powder 4 are disposed on the color filter 3. The color filter 3 includes a plurality of color areas, in which the fluorescent powder disposed on each color area corresponds to the color area. For instance, as illustrated in FIG. 2, the color filter 3 includes R color areas, G color areas and B color areas. R powder 41 on the R areas is configured to convert B light into R light, and G powder 42 on the G areas is configured to convert the B light into G light.

Description is given to how to form the fluorescent powder 4 disposed on the color filter 3 by taking the case that the color filter 3 includes the R areas, the G areas and B areas as an example.

Firstly, one layer of R powder is plated or deposited on the color filter 3. Secondly, films of the R powder are subjected to photolithography according to the shape of the R areas; the shape of the films of the R powder retained after photolithography is the same with that of the R areas; and the films of the R powder are disposed on the R areas.

Thirdly, one layer of G powder is plated or deposited on areas of the color filter 3 except the R areas. And fourthly, films of the G powder are subjected to photolithography according to the shape of the G areas; the shape of the films of the G powder retained after photolithography is the same with that of the G areas; and the films of the G powder are disposed on the G areas.

2. The fluorescent powder 4 is disposed in the color filter 3.

Figure 3:
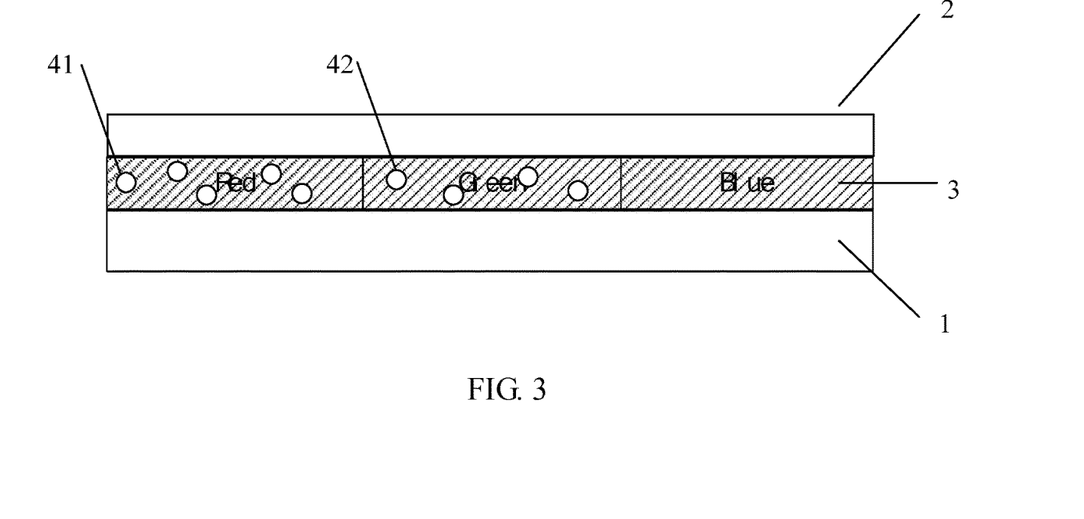
FIG. 3 is a schematic structural view of a color filter substrate provided by still another embodiment of the present disclosure.

As illustrated in FIG. 3, the fluorescent powder 4 is disposed in the color filter 3, in which the type of the fluorescent powder 4 corresponds to a color area provided with the fluorescent powder. For instance, particles of R powder 41 in R areas are configured to convert B light into R light; particles of G powder 42 in G areas are configured to convert B light into G light; the R powder 41 is disposed in the R areas; and the G powder 42 is disposed in the G areas. It should be noted that the ratio of the amount of the particles of the fluorescent powder 4 disposed in the color filter 3 to the amount of materials of the color filter 3 is appropriate, so as to improve the light transmittance of the color filter 3 as much as possible.

Second Embodiment: Improving the Transmittance of the Light Running Through the Color Filter Substrate by Arranging the Antireflective Films 5

Strong reflection phenomenon will occur when light runs through an interface of two substances due to different refractive indexes of the two substances, so antireflective films may be disposed on the interface of the two substances to alleviate the reflection phenomenon. In the embodiment of the present disclosure, the antireflective films 5 may be disposed in the color filter substrate by the following three modes.

(1) Arranging the Antireflective Films 5 Between the Protective Layer 2 and the Color Filter 3.

Figure 4:
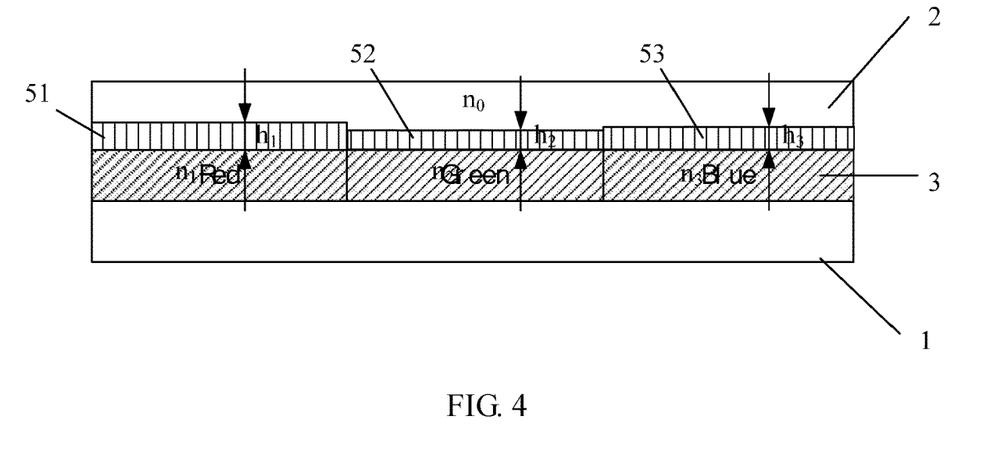
FIG. 4 is a schematic structural view of a color filter substrate provided by one embodiment of the present disclosure, in which antireflective films are disposed on incident side of color filter.

In one embodiment of the present disclosure, as illustrated in FIG. 4, the antireflective films 5 are disposed on an interface of the protective layer 2 and the color filter 3, and the refractive index of the antireflective films 5 is between the refractive index of the protective layer 2 and the refractive index of the color filter 3.

The color filter 3 may include three kinds of color areas, in which the refractive index of R areas is $n_1$; the refractive index of G areas is $n_2$; the refractive index of B areas is $n_3$; and the refractive index of the protective layer 2 is no. Thus, the refractive index $N_1$ of an antireflective film 51 between the R area and the protective layer 2 is between $n_0$ and $n_1$; the refractive index $N_2$ of an antireflective film 52 between the G area and the protective layer 2 is between $n_0$ and $n_2$; and the refractive index $N_3$ of an antireflective film 53 between the B area and the protective layer 2 is between $n_0$ and $n_3$.

In one embodiment of the present disclosure, the refractive index of the R area is $n_1$; the refractive index of the G area is $n_2$; the refractive index of the B area is $n_3$; the refractive index of the protective layer 2 is no; and the refractive indexes of antireflective films 5, disposed between the color filter 3 and the protective layer 2, at the position of the R area, the G area and the B area are $\sqrt{n_1 n_0}$, $\sqrt{n_2 n_0}$ and $\sqrt{n_3 n_0}$, respectively. When the refractive index of the antireflective films is closer to the above values, after the arrangement of the antireflective films, the light transmittance is higher. That is to say, the refractive indexes of the antireflective films 5 in different color areas are different.

As illustrated in FIG. 4, as for the thickness of the antireflective films 5 corresponding to different color areas of the color filter 3, the thickness of the antireflective films corresponding to the R areas is $h_1$; the thickness of the antireflective films 5 corresponding to the G areas is $h_2$; and the thickness of the antireflective films 5 corresponding to the B areas is $h_3$. The values of $h_1$, $h_2$ and $h_3$ may partially be the same, all be the same or all be different. FIG. 4 illustrates the case that the values are all different.

In one embodiment of the present disclosure, the refractive index of the antireflective film 5 is n; the thickness of the antireflective film 5 is h; and the wavelength of light for improving the transmittance is λ. In order to prevent halfwave loss, the thickness of the antireflective film 5 may satisfy nh=λ/4, 3λ/4, . . . , mλ/4, in which m is a positive odd integer, and λ is selected according to corresponding color area. The value of λ of an R light antireflective film 5 is 620-760 nm; the value of λ of a G light antireflective film 5 is 500-560 nm; and the value of A of a B light antireflective film 5 is 450-480 nm. As the color areas correspond to different wavelengths, the thickness of the antireflective films corresponding to the R areas, the B areas and the G areas is different.

(2) Arranging the Antireflective Films 5 Between the Base Substrate 1 and the Color Filter 3.

Figure 5:
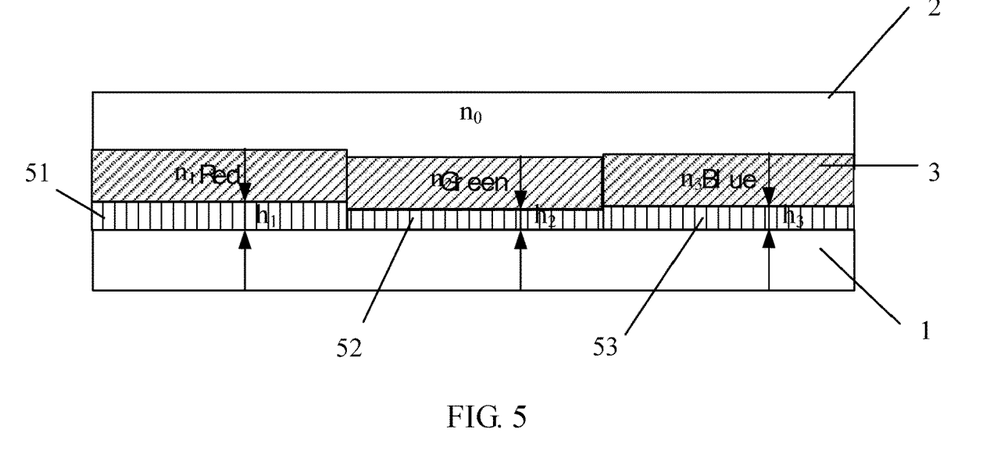
FIG. 5 is a schematic structural view of a color filter substrate provided by one embodiment of the present disclosure, in which antireflective films are disposed on light-emitting side of color filter.

In one embodiment of the present disclosure, as illustrated in FIG. 5, the antireflective films 5 are disposed on an interface of the base substrate 1 and the color filter 3, and the refractive index of the antireflective films 5 disposed on the interface of the base substrate 1 and the color filter 3 is between the refractive index of the base substrate 1 and the refractive index of the color filter 3.

The refractive index and the thickness of the antireflective films 5 may refer to those of the antireflective films 5 disposed between the protective layer 2 and the color filter 3, only needing to replace the parameters of the protective layer 2 by the parameters of the base substrate 1.

(3) Arranging the Antireflective Films 5 Between the Protective Layer 2 and the Color Filter 3, and Meanwhile, Arranging the Antireflective Films 5 Between the Base Substrate 1 and the Color Filter 3.

Figure 6:
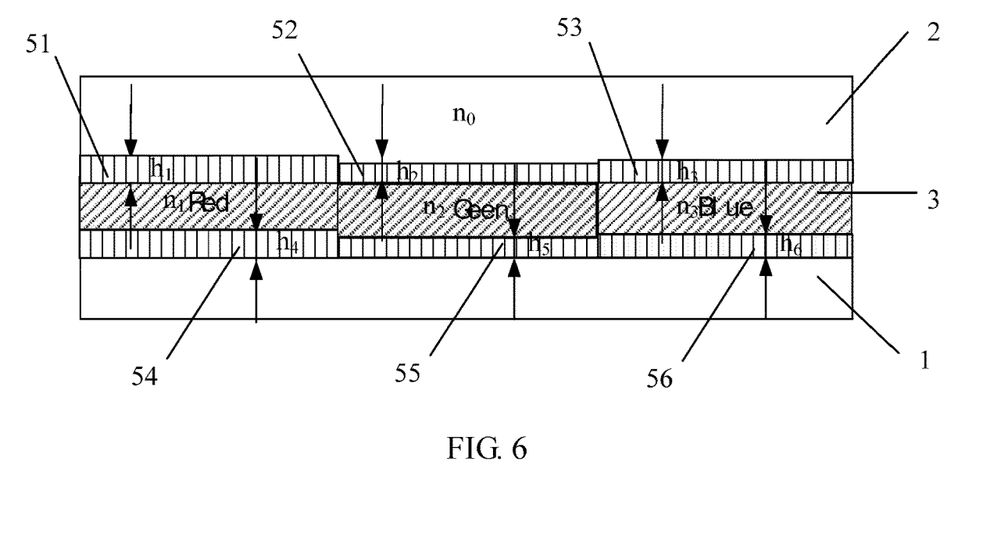
FIG. 6 is a schematic structural view of a color filter substrate provided by one embodiment of the present disclosure, in which antireflective films are disposed on incident side and light-emitting side of color filter.

In one embodiment of the present disclosure, as illustrated in FIG. 6, antireflective films 5 are disposed on an interface between the base substrate 1 and the color filter 3, and antireflective films 5 are disposed on an interface between the protective layer 2 and the color filter 3. The numerical range of the refractive index and the thickness of the antireflective films 5 disposed between the base substrate 1 and the color filter 3 are the same with those in the case (2) described above, and the numerical range of the refractive index and the thickness of the antireflective films 5 disposed between the protective layer 2 and the color filter 3 are the same with those in the case (1) described above. In FIG. 6, the thickness of an antireflective film 51 between the protective layer 2 and an R area is $h_1$; the thickness of an antireflective film 52 between the protective layer 2 and a G area is $h_2$; the thickness of an antireflective film 53 between the protective layer 2 and a B area is $h_3$; the thickness of an antireflective film 54 between the base substrate 1 and the R area is $h_4$; the thickness of an antireflective film 55 between the base substrate 1 and the G area is $h_5$; and the thickness of an antireflective film 56 between the base substrate 1 and the B area is $h_6$. The values of $h_1$ to $h_6$ may partially be the same, all be the same or all be different. FIG. 6 illustrates the case that the values are all different.

Third Embodiment: Improving the Light Transmittance by Simultaneously Arranging the Fluorescent Powder 4 and the Antireflective Films 5

The specific means of adding the fluorescent powder 4 may refer to the first embodiment, and the specific means of arranging the antireflective films 5 may refer to the second embodiment.

When the fluorescent powder 4 is disposed on the incident side of the color filter 3 and the antireflective films 5 are also disposed on the incident side of the color filter 3, one layer of antireflective films 5 may be disposed on films of the fluorescent powder 4, or one layer of antireflective films 5 may be disposed between the films of the fluorescent powder 4 and incident surfaces of the color filter 3.

At least one embodiment of the present disclosure further provides a method for manufacturing a color filter substrate. The method can add the fluorescent powder and/or the antireflective films in the color filter substrate, so as to improve the light transmittance. Description will be given below to the embodiments of adding the fluorescent powder in the color filter substrate, arranging the antireflective films in the color filter substrate, and arranging the fluorescent powder and the antireflective films in the color filter substrate.

First Embodiment: Adding the Fluorescent Powder

In the embodiment of the present disclosure, the fluorescent powder may be disposed on incident side of color filter or disposed in the color filter. Description will be given to the two modes.

Figure 7:
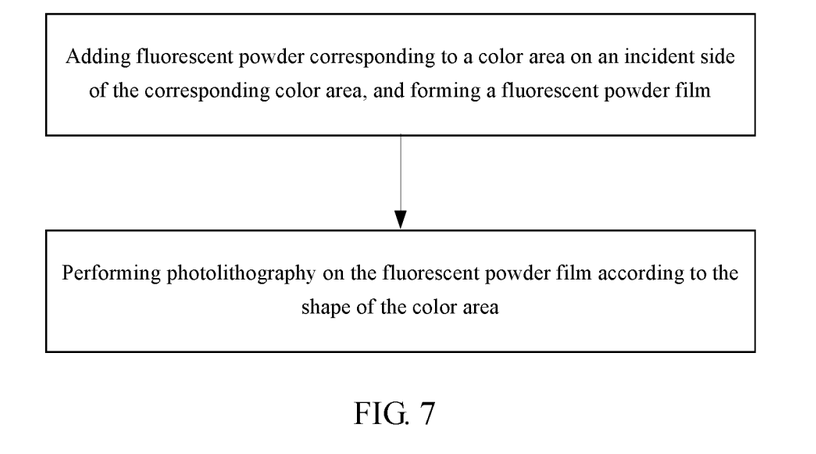
FIG. 7 illustrates a method for manufacturing a color filter substrate, provided by one embodiment of the present disclosure.

As illustrated in FIG. 7, one embodiment of the present disclosure provides a method for manufacturing a color filter substrate. The method comprises:

adding fluorescent powder corresponding to a color area on an incident surface of the color area, and forming a fluorescent powder film; and performing photolithography on the fluorescent powder film according to the shape of the color area.

For instance, fluorescent powder corresponding to a color area is plated or deposited on an incident side of a color filter by chemical vapor deposition (CVD).

In one embodiment of the present disclosure, the color filter includes R areas, G areas and B areas. The type of the fluorescent powder corresponds to the color filter.

In one embodiment of the present disclosure, the fluorescent powder includes R powder and G powder. The R powder corresponds to the R areas of the color filter, and the G powder corresponds to the G areas of the color filter.

In one embodiment of the present disclosure, films made from fluorescent powder corresponding to color areas are formed on different color areas.

The optimum thickness of the added fluorescent powder film may be verified by means of color filter simulation, so that the transmittance of the light running through the color filter substrate can be improved as much as possible.

Figure 8:
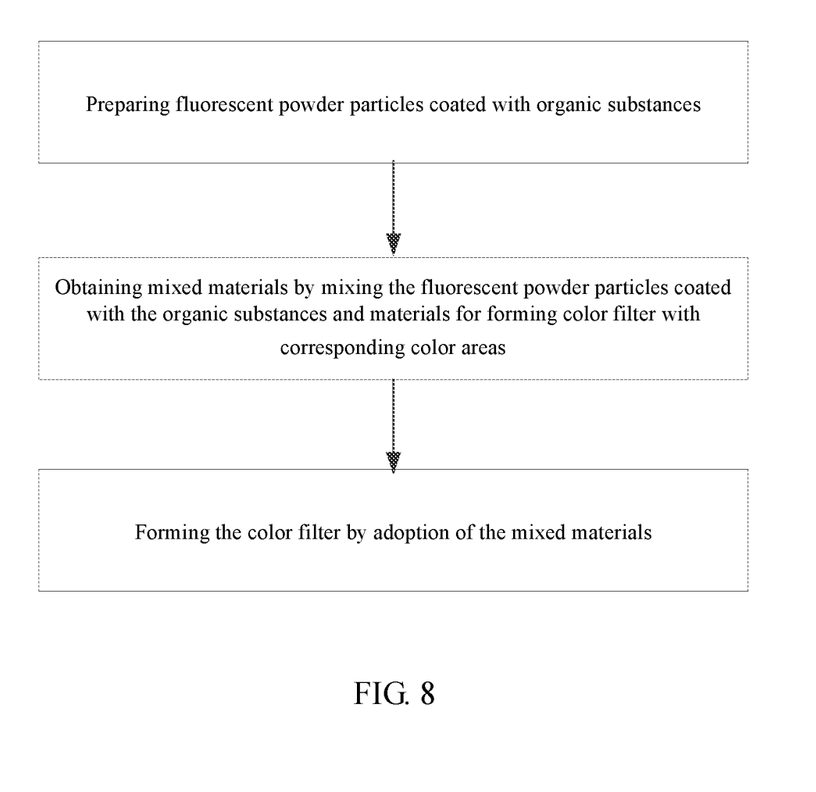
FIG. 8 illustrates a method for manufacturing a color filter substrate, provided by another embodiment of the present disclosure.

As illustrated in FIG. 8, another embodiment of the present disclosure provides a method for manufacturing a color filter substrate, which comprises:

preparing fluorescent powder particles coated with organic substances;

obtaining mixed materials by mixing the fluorescent powder particles coated with the organic substances and materials for forming color filter with corresponding color areas; and forming the color filter by adoption of the mixed materials.

In the embodiment of the present disclosure, the fluorescent powder is an inorganic substance. In order to allow the fluorescent powder to make full contact with the organic materials for forming the color filter, organic substances having the same polarity with the fluorescent powder, of which the type corresponds to the color areas, are adopted to coat the particles of the fluorescent powder, so as to prepare the fluorescent powder particles coated with the organic substances.

In the embodiment of the present disclosure, the addition of the fluorescent powder particles in the color areas will increase the transmittance of light of other colors in the color areas but will affect the transmittance of light with the color corresponding to the color areas. But general speaking, after the addition of the fluorescent powder particles, the loss of the light with the color corresponding to the color areas will be less than the quantity of light with the color corresponding to the color areas, converted by the light of other colors, so that the transmittance of the light with the color corresponding to the color areas can be improved.

Second Embodiment: Arranging the Antireflective Films

In the embodiment of the present disclosure, there are three methods for arranging the antireflective films according to the setting position of the antireflective films.

(1) Arranging Antireflective Films on Incident Sides of Color Areas.

Figure 9:
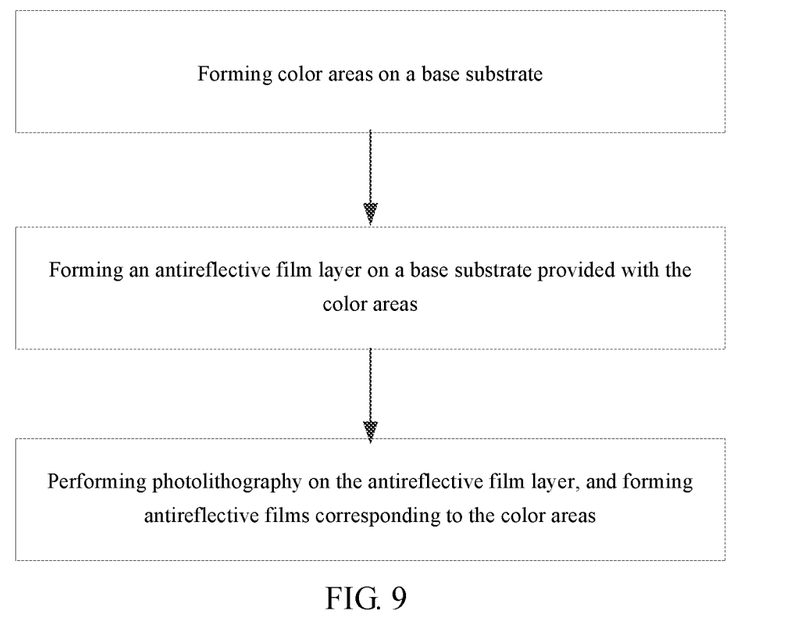
FIG. 9 illustrates a method for manufacturing a color filter substrate, provided by still another embodiment of the present disclosure.

As illustrated in FIG. 9, still another embodiment of the present disclosure provides a method for manufacturing a color filter substrate, which comprises:

forming color areas on a base substrate;

forming an antireflective film layer on a base substrate provided with the color areas; and performing photolithography on the antireflective film layer, and forming antireflective films corresponding to the color areas.

The step of forming the antireflective films corresponding to the color areas indicates that the shape of the formed the antireflective films is the same with the shape of the color areas, and projections of the antireflective films and the color areas on the base substrate are the same.

(2) Arranging Antireflective Films on Light-Emitting Sides of Color Areas

Figure 10:
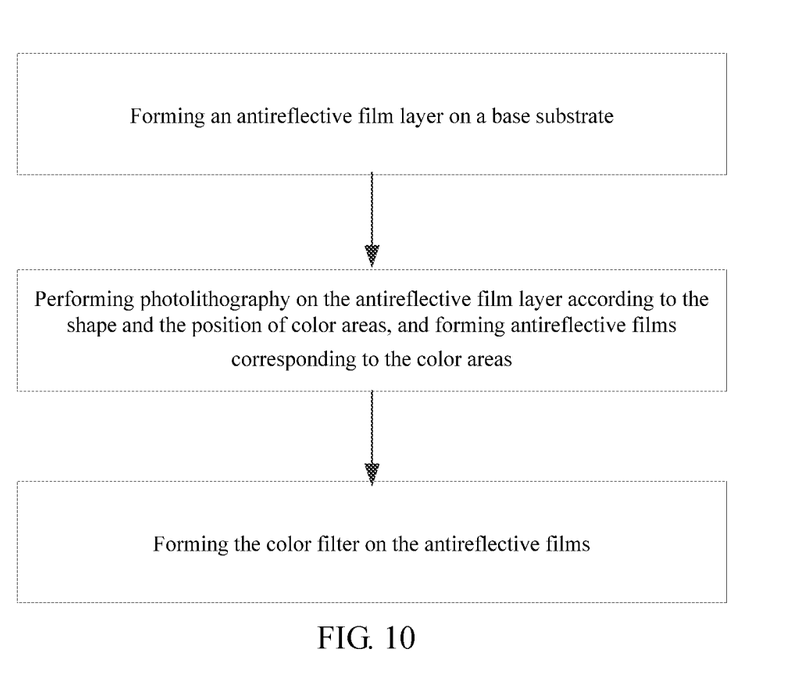
FIG. 10 illustrates a method for manufacturing a color filter substrate, provided by still another embodiment of the present disclosure.

As illustrated in FIG. 10, still another embodiment of the present disclosure provides a method for manufacturing a color filter substrate, which comprises:

forming an antireflective film layer on a base substrate;

performing photolithography on the antireflective film layer according to the shape and the position of color areas, and forming antireflective films corresponding to the color areas; and forming color filter on the antireflective films.

The step of forming the antireflective films corresponding to the color areas indicates that the shape of the formed antireflective films is the same with the shape of the color areas, and projections of the antireflective films and the color areas on the base substrate are the same.

The method of forming the antireflective film corresponding to the color areas on the light-emitting sides of the color areas may also be adopted.

(3) Arranging the Antireflective Films on Both the Incident Sides and the Light-Emitting Sides of the Color Areas.

Firstly, the antireflective films are disposed on the light-emitting sides of the color areas according to the method in (2), and subsequently, the antireflective films are disposed on the incident sides of the color areas according to the method in (1).

The refractive index and the thickness of the arranged antireflective films are relevant to the position of the antireflective films and the color areas corresponding to the antireflective films: the corresponding relationship is as described above, and no further description will be given here. The arrangement of the antireflective films may also adopt the CVD method.

Third Embodiment: Arranging Both the Fluorescent Powder and the Antireflective Films In the embodiment of the present disclosure, the method of simultaneously arranging the fluorescent powder and the antireflective films on the color filter substrate is divided into the following six modes:

(1) Arranging Fluorescent Powder Films on Incident Side of Color Filter, and Arranging Antireflective Films on Light-Emitting Side of the Color Filter.

Firstly, the antireflective films are disposed on the light-emitting side of the color filter by the method in FIG. 10, and subsequently, the fluorescent powder films are disposed on the incident side of the color filter by the method in FIG. 7.

(2) Arranging Fluorescent Powder Films on Incident Side of Color Filter, and Arranging Antireflective Films on the Incident Side of the Color Filter.

When the fluorescent powder films are disposed between the incident side of the color filter and the antireflective films, firstly, the color filter may be formed on the base substrate. Secondly, one fluorescent powder film layer is disposed on the color filter, the fluorescent powder film layer is subjected to photolithography according to the shape of the color areas; and fluorescent powder films are formed. Thirdly, one antireflective film layer is disposed on the fluorescent powder films; the antireflective film layer is subjected to photolithography according to the shape of the color areas; and antireflective films are formed.

Or, firstly, color filter is formed on the base substrate; secondly, one fluorescent powder film layer and one antireflective film layer are sequentially formed on the color filter; and thirdly, the antireflective film layer and the fluorescent powder film layer are subjected to photolithography according to the shape of the color areas, and antireflective films and fluorescent powder films are formed.

When the fluorescent powder films are disposed between the protective layer and the antireflective films, firstly, color filter may be formed on the base substrate; secondly, one layer of antireflective films is disposed on the color filter, and the antireflective films are subjected to photolithography according to the shape of the color areas; and thirdly, one layer of fluorescent powder films is disposed on the antireflective films, and the fluorescent powder films are subjected to photolithography according to the shape of the color areas.

Or, firstly, color filter is formed on the base substrate; secondly, one antireflective film layer and one fluorescent powder film layer are sequentially disposed on the color filter, and thirdly, the fluorescent powder film layer and the antireflective film layer are subjected to photolithography according to the shape of the color areas, and fluorescent powder films and antireflective films are formed.

(3) Arranging Fluorescent Powder Films on the Incident Side of Color Filter, and Respectively Arranging Antireflective Films on the Incident Side and the Light-Emitting Side of the Color Filter.

The antireflective films are disposed on the light-emitting side of the color filter by the method in FIG. 10, and subsequently, the fluorescent powder films and the antireflective films are disposed on the incident side of the color filter by the method in (2).

(4) Adding Fluorescent Powder Particles in Color Areas, and Arranging Antireflective Films on Light-Emitting Side of Color Filter.

The color filter is formed by the method in FIG. 8; the antireflective films are disposed on the light-emitting surface of the color filter by the method in FIG. 10; and the formed color filter is disposed on the antireflective films.

(5) Adding Fluorescent Powder Particles in Color Areas, and Arranging Antireflective Films on Incident Side of Color Filter.

The color filter is disposed on the base substrate by the method in FIG. 8, and subsequently, the antireflective films are disposed on the incident side of the color filter by the method in FIG. 9.

(6) Adding Fluorescent Powder Particles in Color Areas, and Respectively Arranging Antireflective Films on Incident Side and Light-Emitting Side of Color Filter.

The color filter is formed by the method in FIG. 8; the antireflective films are disposed on the light-emitting side of the color filter by the method in FIG. 10, and the color filter is disposed on the antireflective films; and subsequently, the antireflective films are disposed on the incident side of the color filter by the method in FIG. 9.

At least one embodiment of the present disclosure provides a color filter substrate, which comprises a base substrate, a protective layer and a color filter disposed between the base substrate and the protective layer. The color filter includes a plurality of color areas. The color filter substrate further comprises at least one of at least one kind of fluorescent powder or at least one antireflective film, in which each kind of fluorescent powder in the at least one kind of fluorescent powder corresponds to one color area in the color filter; each antireflective film in the at least one antireflective film corresponds to one color area in the color filter; the fluorescent powder is disposed on the incident side of corresponding color areas and/or distributed in the corresponding color areas and configured to convert light, of which the color is different from the color of the corresponding color areas, in incident light into light of which the color is the same with the color of the color areas; and the antireflective films are disposed on the incident sides of the corresponding color areas and/or light-emitting sides of the corresponding color areas and configured to reduce the reflectivity of the light, of which the color is the same with the color of the corresponding color areas, in the incident light. As the color filter substrate provided by the embodiment of the present disclosure can convert light of which the color is different from the color of the color filter into light of which the color is the same with the color of the color filter in the color filter substrate by adoption of the fluorescent powder, and/or arrange the antireflective films on the color filter to reduce the reflectivity of light running through the color filter substrate, the transmittance of light incident into the color filter can be improved.

The foregoing is merely exemplary embodiments of the invention, but is not used to limit the protection scope of the invention. The protection scope of the invention shall be defined by the attached claims.

The application claims priority to the Chinese patent application No. 201610038937.7, filed Jan. 20, 2016, the entire disclosure of which is incorporated herein by reference as part of the present application.

The invention claimed is:

1. A color filter substrate, comprising a base substrate and a color filter formed on the base substrate, wherein the color filter includes a plurality of color areas; the color filter substrate further comprises a plurality of antireflective films,
   wherein each antireflective film in the plurality of antireflective films corresponds to one color area in the color filter,
   the antireflective film is configured to reduce a reflectively of the light of which the color is the same with the color of the corresponding color area,
   refractive indexes of the plurality of antireflective films in different color areas are different, thickness of the plurality of antireflective films in different color areas are different,
   the color filter substrate further comprises a protective layer; the protective layer is disposed on an Incident side of the color filter substrate; the plurality of antireflective films are disposed between the productive layer and the plurality of color areas; and a reflective Index of each of the plurality of antireflective films is between a refractive index of the corresponding color area and a refractive index of the protective layer,
   the plurality of color areas comprises a red area, a green area, and a blue area, refractive of the red area is $n_1$; refractive index of the green area is $n_2$; refractive index of the blue area is $n_3$; and refractive index of the protective layer 2 is $n_0$;
   refractive index $N_1$ of the antireflective film between the red area and the protective layer is between $n_0$ and $n_2$; refractive Index $N_2$ of the antireflective film between the green area and the protective layer is between $n_0$ and $n_2$; and refractive index $N_3$ of the antireflective film between the blue area and the protective layer is between $n_0$ and $n_3$.

2. The color filter substrate according to claim 1, wherein at least one kind of florescent powder is distributed in each corresponding color area; and particles containing the at least one kind of florescent powder are distributed in each corresponding color area.

3. The color filter substrate according to claim 2, wherein the at least one kind of florescent powder includes fluorescent powder for converting blue (B) light into red (R) light and fluorescent powder for converting B light into green (G) light.

4. The color filter substrate according to claim 1, wherein the plurality of antireflective films are disposed on an incident side of the corresponding color area.

5. The color filter substrate according to claim 1, wherein each of the plurality of antireflective films are disposed on a light-emitting side of the corresponding color area and makes contact with the corresponding color area.

6. The color filter substrate according to claim 1, wherein the plurality of antireflective films are disposed on a light-emitting side of the plurality of color areas and between the plurality of color areas and the base substrate; and a refractive index of each of the plurality of the antireflective films is between a refractive index of the corresponding color area and a refractive index of the base substrate.

7. The color filter substrate according to claim 1, wherein each of the plurality of antireflective films has a thickness of $m\lambda/4n$, in which m is a positive odd integer; $\lambda$ refers to a light wavelength corresponding to the corresponding color area; and n refers to a refractive index of the each of the plurality of antireflective films.

8. A method for manufacturing a color filter substrate, comprising;
   arranging a plurality of antireflective films corresponding to a plurality of color areas on an incident side and/or a light-emitting side of the plurality of color areas of the color filter; in which each of the plurality of antireflective films covers a corresponding color area and is configured to reduce a reflectivity of light, of which the color is the same with the color of the corresponding color area, in light of the backlight;
   forming a protective layer on an incident side of the color filter substrate,
   wherein refractive indexes of the plurality of antireflective films in different color areas are different, thickness of the plurality of antireflective films in different color areas are different,
   the plurality of antireflective films are disposed between the protective layer and the plurality of color areas; and a refractive index of each of the plurality of antireflective films is between a refractive index of the corresponding color area and a refractive index of the protective layer,
   the plurality of color areas comprises a red area, a green area, and a blue area, refractive index of the red area in $n_1$; refractive index of the green area is $n_2$; refractive index of the blue area is $n_3$; and reflective index of the protective layer 2 is $n_0$;
   refractive index $N_1$ of the antireflective film between the red area and the protective layer is between $n_0$ and $n_1$; refractive index $N_2$ of the antireflective film between the green area and the protective layer is between $n_0$ and $n_2$; and refractive index $N_3$ of the antireflective film between the blue area and the protective layer is between $n_1$ and $n_3$.

9. The method according to claim 8, further comprising: arranging fluorescent powder corresponding to a color area in the plurality of color areas of a color filter or on an incident side of the plurality of color areas, and forming the protective layer on the color filter provided with the fluorescent powder, in which each kind of fluorescent powder corresponds to one color area in the color filter, and the fluorescent powder is configured to convert light of at least one color, different from a color of a corresponding color area, in light of backlight into light of which a color is the same with the color of the corresponding color area,
   wherein arranging the fluorescent powder corresponding to the color area on the incident side of the color area in the plurality of color areas of the color filter comprises:
   arranging a film made from the fluorescent powder, of which a type corresponds to the color area, on the incident side of the corresponding color area; and
   performing photolithography on the film made from the fluorescent powder according to a shape of the color area; and
   arranging the fluorescent powder corresponding to the color area in the plurality of color areas, of the color filter comprises:
   obtaining fluorescent powder particles coated with organic substances by coating particles of the fluorescent powder using organic substances of which a polarity is similar to that of the fluorescent powder corresponding to the color area;

obtaining mixed materials by mixing the fluorescent powder particles coated with the organic substances and materials for forming the color filter for the corresponding color area; and forming the color filter by adoption of the mixed materials.

10. The method according to claim 9, wherein the fluorescent powder includes fluorescent powder for converting B light into R light and fluorescent powder for converting B light into G light.

11. The method according to claim 8, wherein arranging the antireflective film corresponding to the color area on the incident side of the plurality of color areas of the color filter, in which each of the plurality of antireflective films covers the corresponding color area, comprises:

arranging the antireflective film corresponding to the color area on the incident side of the color area, and performing photolithography on the antireflective film according to a shape of the color area; and arranging the antireflective film corresponding to the color area on the light-emitting side of the plurality of at least one color areas of the color filter, in which the antireflective film covers the color area corresponding to the antireflective film, comprises:

arranging the antireflective film corresponding to the color area on the incident side of the base substrate; performing photolithography on the antireflective film according to the shape and the position of the color area; and forming the color filter on the antireflective film.

12. The method according to claim 11, wherein the color filter is disposed between the base substrate and the protective layer; and the antireflective film corresponding to the plurality of color areas is disposed on the incident side of the plurality of color areas of the color filter, a refractive index of the antireflective film is between a refractive index of the protective layer and a refractive index of the color area.

13. The method according to claim 11, wherein the color filter is disposed between the base substrate and the protective layer; and the antireflective film corresponding to the plurality of color areas is disposed on the light-emitting side of the plurality of color areas of the color filter, a refractive index of the antireflective film is between a refractive index of the color area and a refractive index of the base substrate.

14. The color filter substrate according to claim 1, wherein the color filter substrate further comprises at least one kind of fluorescent powder, each kind of fluorescent powder in the at least one kind of fluorescent powder corresponds to one color area in the color filter;

the fluorescent powder is configured to convert light, of which a color is different from a color of a corresponding color area, in incident light into light of which a color is the same with the color of the corresponding color area.

15. The color filter substrate according to claim 14, wherein the at least one kind of fluorescent powder is disposed on an incident side of each corresponding color areas; and a film made from the at least one kind of fluorescent powder is disposed on the incident side of each corresponding color area.

16. The color filter substrate according to claim 1, wherein the refractive index $N_1$ of the antireflective film between the red area and the protective layer is $\sqrt{n_1 n_0}$; the refractive index $N_2$ of the antireflective film between the green area and the protective layer is $\sqrt{n_2 n_0}$; and the refractive index $N3$ of the antireflective film between the blue area and the protective layer is $\sqrt{n_3 n_0}$.

17. The color filter substrate according to claim 1, wherein the plurality of antireflective films are located between the base substrate and the color filter and between the color filter and the protective film.

* * * * *